April 6, 1965  R. O. ISENBARGER  3,177,041
HUB CAP ASSEMBLY
Filed July 10, 1963  2 Sheets-Sheet 1
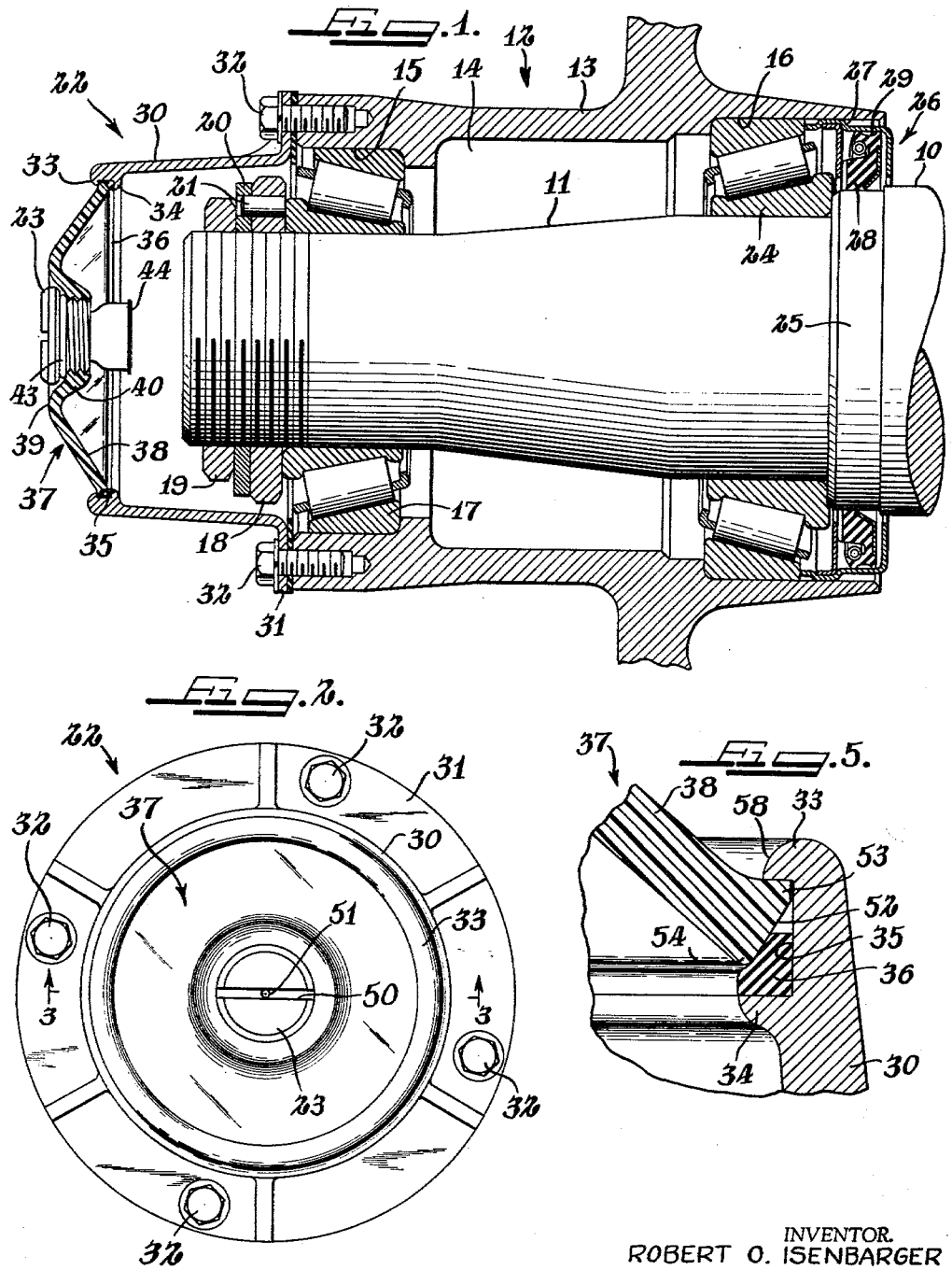
INVENTOR.
ROBERT O. ISENBARGER
BY
Greist, Lockwood, Greenawalt & Dewey
Attys.

April 6, 1965   R. O. ISENBARGER   3,177,041
HUB CAP ASSEMBLY
Filed July 10, 1963   2 Sheets-Sheet 2
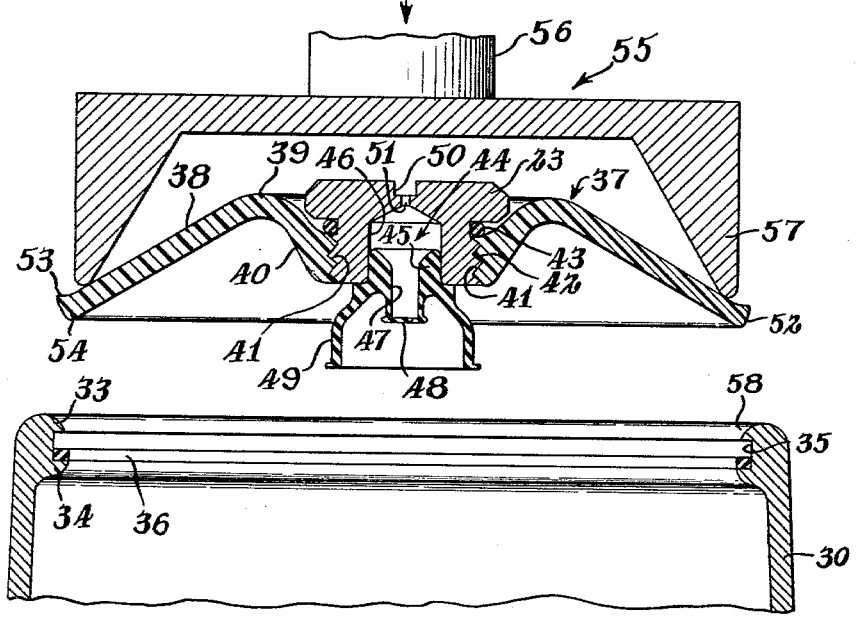
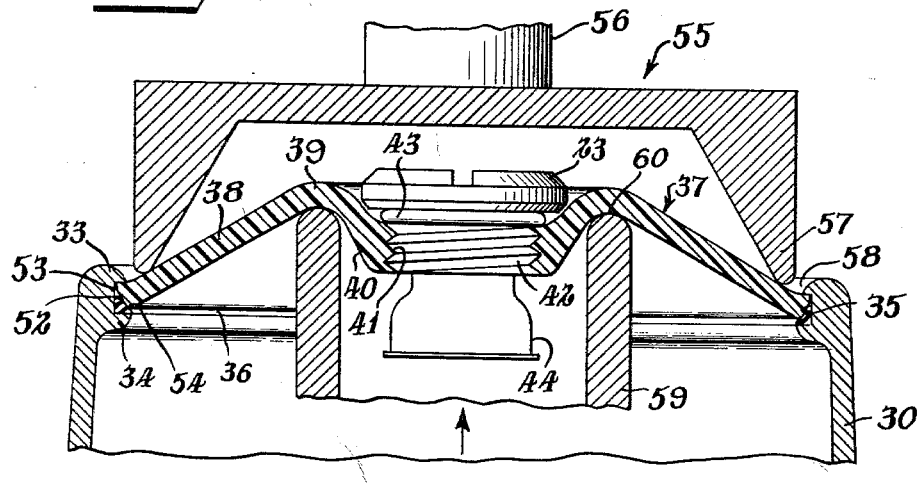
INVENTOR.
ROBERT O. ISENBARGER

United States Patent Office 3,177,041
Patented Apr. 6, 1965

3,177,041
HUB CAP ASSEMBLY
Robert O. Isenbarger, Chicago, Ill., assignor to Chicago Rawhide Manufacturing Company, Chicago, Ill., a corporation of Illinois
Filed July 10, 1963, Ser. No. 294,054
8 Claims. (Cl. 310—108)

The invention relates to a new and improved hub cap assembly for wheel housings, particularly in trailer axle and wheel units, wherein the wheel housing establishes a reservoir for free flowing lubricant. More specifically, the invention deals with a hub cap including a specially formed and mounted window means of improved durability and capable of ready mounting and removal as well as illumination of the interior of the wheel housing reservoir.

Trailer wheel and axle assemblies, especially the assemblies used on large trailers and semi-trailers, basically involve the mounting of a wheel on a fixed axle or spindle for rotation thereabout. The hub of the wheel defines a lubricant reservoir about the end of the spindle in association with the wheel bearings. A quantity of lubricant is maintained in the reservoir or wheel housing to provide a bath-like action. It is often the case that a special transparent hub cap is used to provide means whereby the level of lubricant in the wheel housing can be readily observed for maintenance purposes.

Transparent hub cap means also include a venting arrangement communicating with the wheel housing to provide for pressure equalization. Operation of the trailer results in a heating of the lubricant and with such heating a super-atmospheric pressure is created within the wheel housing. By use of vent means the internal pressure can be relieved thus avoiding interference with lubricant distribution over the bearings. A highly desirable form of vent means is disclosed in my copending application Serial No. 198,019, filed May 28, 1962, now Patent No. 3,114,579.

In my aforementioned application I disclose a somewhat typical form of hub cap utilizing a cup-shaped member formed from transparent plastic material. Hub caps of this type permit ready observance of lubricant in the wheel housing but are rather fragile and are fully exposed to destructive forces occurring during trailer operation. In order to provide suitable window means for lubricant reservoir observance and yet protect the window means from operational damage, it has been conventional to form the hub cap from a sleeve-like metallic member open at the outer end and receiving therein a flat disc-like glass or plastic window. This type of assembly places the window in a single vertical plane and enclosed in the outer end portion of the metallic hub cap thus at least substantially limiting, if not totally preventing, adequate illumination of the interior of the wheel housing. Furthermore, a window member of this type is normally attached to the hub cap by a plurality of circumferentially spaced fasteners threaded into the hub cap. Inadvertent overtightening of the fasteners can result in window member fracture not only leading to lubricant loss but further interfering with observance of lubricant supply in the wheel housing. Additionally, the use of a single plane window member limits the total area available for viewing the interior of the wheel housing by reason of the normal provision of a centrally located removal plug means which permits lubricant replacement during trailer axle maintenance.

It is an object of the invention to provide a new and improved hub cap adapted for application to a trailer wheel or the like, the hub cap including as a part thereof a specially shaped and mounted window means capable of new and improved functioning.

Another object is to provide a new and improved hub cap assembly including a specially configurated and readily mounted window means, the window means being of generally outwardly projecting frusto-conical shape and providing for light refraction into the interior of a wheel housing to which the hub cap is attached, the special configuration further imparting adequate strength to the window member to resist forces applied thereto under normal operating conditions while additionally permitting ready accommodation of plug means as well as ready insertion and removal.

Still a further object taken in conjunction with the foregoing objects is to provide a new and improved hub cap assembly including a specially configurated window means of the type described having unique mounting means cooperating with special retention means forming a part of the assembly whereby the window means can be readily mounted in the assembly or removed therefrom without danger of fracture.

Other objects not specifically set forth will become apparent from the following detailed description of the invention made in conjunction with the accompanying drawings wherein:

FIG. 1 is a fragamentary section of a known type of trailer wheel assembly illustrating operative mounting of the hub cap of the invention;

FIG. 2 is an end elevation of the mounted hub cap;

FIG. 3 is an enlarged composite section of the outer end portion of the hub cap as viewed generally along line 3—3 in FIG. 1 and illustrating the window means thereof separated from the body portion and in combination with a special assembly tool;

FIG. 4 is a view similar to FIG. 3 illustrating the window member in mounted relation in the assembly and additionally illustrating the use of a special window member removal tool; and FIG. 5 is an enlarged fragmentary section of a peripheral portion of the window means illustrating operative mounting thereof in the hub cap assembly.

A typical trailer wheel assembly is illustrated in FIG. 1. As is well known, such an assembly includes a fixed axle 10 having a spindle 11 forming a part thereof and about which a wheel 12 is received. The wheel 12 includes a hub 13 which internally thereof defines a lubricant housing 14 arranged between a pair of axially aligned, spaced bores 15 and 16. The bore 15 has mounted therein a roller bearing assembly which includes an outer race 17. The bearing assembly is engaged with the outer end of the spindle 11 with the wheel 12 being suitably locked on the axle 10 by a lock nut assembly including nuts 18 and 19 and an intermediate washer 20, the latter being fixedly combined with the nut 18 by a locking pin 21 of known type. A hub cap 22 encloses the outer end of the bore 15 of the hub 13 and carries a removable filler plug 23 which upon removal permits lubricant filling of the housing 14. Lubricant in the housing 14 is maintained at a prescribed level which is readily observable through the hub cap 22 as will be described.

The bore 16 has mounted therein a roller bearing assembly which includes an inner race 24 engaged with the spindle 11. A spindle collar 25 in the form of an enlarged shoulder portion is located immediately outwardly of the roller bearing assembly in the bore 16. A seal assembly 26 of any suitable design is received in the bore 16 and is mounted in sealing engagement on the collar 25. The seal assembly 26 includes a stamping portion 27 which is press fitted in the bore 16. A rubber-like sealing member 28 frictionally engages the collar 25 and is formed with an outwardly pressed sealing lip portion 29 held in running sealing engagement with the stamping portion 27 which rotates with the wheel 12.

As shown in FIGS. 1 and 2, the hub cap 22 includes an annular body portion provided with an axially projecting sleeve or collar portion 30 formed at the base thereof with an integral outwardly projecting, circumferentially continuous attachment flange 31. A plurality of circumferentially spaced fasteners 32 extend through the flange 31 into the outer radial surface of the wheel 12 surrounding the bore 15. In this manner the hub cap 22 is removably fastened to the wheel 12.

The inner surface of the outer end portion of the collar 30 is formed with a pair of axially spaced, radially inwardly projecting and circumferentially continuous shoulders 33 and 34 defining an inwardly opening groove 35 therebetween in which is received a circumferentially continuous gasket 36 and the outer periphery of a transparent and relatively flexible window means or member 37.

The window member 37 is of generally outwardly projecting, frusto-conical configuration having a central recessed area in which the plug 23 is received. As shown in FIGS. 1, 3 and 4, the window member 37 specifically is shaped with an outer annular frusto-conical portion 38 joined centrally with an annular convex rim-like portion 39 which in turn is joined with an axially inwardly reversed frusto-conical portion 40 in turn centrally apertured as defined by integrally formed and axially extending threads 41. The reversed frusto-conical portion 40 defines a central recess area with the plug 23 being received therein and substantially filling the same. This plug includes an enlarged head portion integrally formed with a shank provided along the outer surface thereof with threads 42 cooperatively engaged with the threads 41 of the window member. An O-ring seal 43 is compressed between the inner surface of the enlarged head and the adjacent surface of the window member to seal the plug 23 in the window member.

The plug 23 includes as a part thereof a rubber vent valve means 44 of the type disclosed in my aforementioned copending application. Among other things, the vent valve 44 includes a mounting portion 45 (FIG. 3) frictionally received in a central bore 46 of the plug and in turn including a central bore 47 closed at the outer end by a known type of rubber flap valve 48 designed to open only inwardly of the bore 47 to relieve superatmospheric pressure built up in the wheel housing. The vent valve 45 further includes an inwardly projecting and enlarged cup-like baffle portion 49 which substantially protects the valve flap 48 from direct contact with lubricant under motion in the wheel housing. This prevents inadvertent lubricant loss. The plug 23 includes a tool receiving slot 50 in the head thereof and a small vent port 51 is in communication with the vent valve 44. The plug and assembled vent valve can be readily removed from the window member 37 for lubricant filling of the wheel housing with the hub cap 22 retained in operative attachment with the wheel 12.

As best shown in FIG. 5, the outer periphery of the frusto-conical portion 38 of the window member 37 is formed with a circumferentially continuous foot-like portion defined by a radially outwardly inclined base surface 52 arranged at an angle of approximately 30° relative to the longitudinal axis of the hub cap. The outer end of the foot-like portion includes a toe portion 53 projecting outwardly and the opposite surface of the foot-like portion defines a heel portion 54. In the installed condition of the window member as best illustrated in FIG. 5, the toe portion 53 abuts the inner surface of the shoulder 33, the base surface 52 substantially engages and compresses the gasket 36 between the base of the groove 35 and the inner surface of the shoulder 34, and the heel portion 54 is at least somewhat embedded in the gasket 36. In effect, the gasket 36 is compressed between the rear portion of the outer periphery of the window member and the inner portion of the groove 35 of the collar 30. In this manner a complete seal is obtained which prevents any possible loss of lubricant and yet the window member 37 is subject to removal from the collar 30 as will be described.

The collar 30 and flange 31 of the hub cap are formed from rigid metallic material and, as previously mentioned, the window member 37 is formed from transparent, relatively flexible material. Preferably, the window member may be formed from a durable plastic such as a polycarbonate available under the tradename of Lexan. Such material is quite resistant to fracture in response to forces applied thereto and yet is at least somewhat flexible permitting use in the manner to be described. FIG. 3 illustrates the window member 37 dismounted from the collar 30 and having engaged therewith an assembly tool 55 formed with a force application shaft 56 and an annular window member engaging flange portion 57. The tool 55 is dimensioned to engage the window member 37 just inwardly of the outer periphery thereof. The base surface 52 is suitably inclined and dimensioned to initially engage the outer surface 58 of the shoulder 33 of the collar 30. The outer surface 58 is preferably formed with a radius as illustrated or a suitable bevel, such as angularly conforming with the 30° angle of the base surface 52, so that upon contracting flexure of the window member the engaging surfaces 52 and 58 will permit ready sliding of the surface 52 along the surface 58 into the groove 35.

Downward movement of the tool 55 in the direction illustrated in FIG. 3 accompanied by engagement between the surfaces 52 and 58 will ultimately result in a flexing contraction of the window member 37 so that the outer periphery thereof will ultimately be snapped into the groove 35. Once this is accomplished and the tool 55 is withdrawn from engagement with the window member, the window member will flex back into its original shape and the outer periphery will become locked in the groove 35 as best illustrated in FIG. 5.

The particular foot-like configuration of the outer periphery of the window member 37 readily adapts the same for the uncomplicated assembly procedure described in conjunction with FIG. 3. Preferably, the outer dimension of the window member 37 is slightly greater than the dimension of the groove 35 thus retaining the window member 37 under some degree of radial compression in its mounted condition. The inherent resiliency of the material of the window member thus provides for constant urging of the toe portion 53 against the inner surface of the shoulder 33 to establish a highly efficient lubricant seal. The particular configuration of the foot-like portion further in conjunction with the constrained condition of the window member provides a constant pressure against the gasket 36 thus further enhancing the seal.

FIG. 4 illustrates an arrangement by which the window member 37 can be readily disassembled from the collar 30. An auxiliary tool 59 in the form of a collar or sleeve having a rounded outer end surface 60 engages the inner surface of the window member 37 in the rim-like portion 39 and either resists in a stationary manner or is moved in opposition to the installation tool 55. Assuming the tool 55 to be fixed, movement of the tool 59 in the direction indicated in FIG. 4 results in contraction of the outer annular frusto-conical portion 38 and separation of the outer periphery of the window member from the groove 35. In this respect then, the window member 37 is removed from the collar 30 by basically reversing the procedure of installation previously described. Here again, the particular foot-like shape of the outer periphery of the window member readily permits such removal.

Referring particularly to FIG. 1, it will be noted that the window member 37 projects outwardly of the outer end of the collar 30 in a cone shaped manner. The particular configuration of the window member including the outer annular frusto-conical portion 38 and annular convex rim portion 39 not only provides a greater transparent area for viewing the interior of the collar 30, but also provides for light refraction so that the interior of the collar 30 is illuminated to a sufficient extent to further enhance ready observance of the level of lubricant in the housing 14. The outward projection of the window member of course presents the same more readily to operational shock, but the unique configuration of the window member imparts additional strength thereto thus permitting the accommodation of greater shock without fracture. Also, the curvilinear and frusto-conical shape can turn many blows into glancing forces applied to the window member thus relieving the total shock actually absorbed by the window member. The combination plug and vent valve assembly being recessed in the window member is actually protected by the same and is not readily subjected to operational shock tending to promote dislodgement or damage.

To improve interior illumination of the hub cap, the collar 30 can be provided along the inner surface thereof with a highly reflective coating such as aluminum paint. The fact that the collar is opaque readily permits this advantage. While a square section gasket 36 has been illustrated, it will be understood that a gasket of any suitable shape such as an O-ring can be used. The particular positioning and manner of compression of the gasket 36 not only establishes an effective seal but further provides a cushion to the window member to aid in accommodating forces applied to the window member.

Obviously certain modifications and variations of the invention as hereinbefore set forth may be made without departing from the spirit and scope thereof, and therefore only such limitations should be imposed as are indicated in the appended claims.

I claim:

1. A hub cap comprising an annular body portion having an axially projecting collar portion, and window means enclosing the outer end of said collar portion, said window means being of generally frusto-conical shape and projecting outwardly from said collar portion, the outer central area of said window means being recessed and including plug means therein, which plug means is at least substantially confined within said recessed area in protected relation, said window means being formed from transparent material which by reason of its shape refracts light into the interior of said body portion.

2. A hub cap comprising an annular body portion having an axially projecting collar portion, and window means enclosing the outer end of said collar portion, said window means including an outer annular portion of generally frusto-conical shape extending diagonally inwardly from engagement with the outer end of said collar portion and projecting outwardly from said collar portion, said outer annular portion joining a central axially recessed area which defines a filler opening and carries plug means therein, which plug means is at least substantially confined within said recessed area in protected relation, said outer annular portion and central recessed area cooperatively defining a convex annular rim-like portion on the outer surface of said window means, said window means being formed from transparent material which by reason of its shape refracts light into the interior of said body portion.

3. A hub cap comprising an annular body portion of rigid material having a flanged area for attachment and an axially projecting collar portion provided with inner surface groove means, and window means enclosing the outer end of said collar portion, said window means including an outer annular portion of generally frusto-conical shape peripherally retained in said groove means and extending diagonally inwardly from engagement with the outer end of said collar portion and projecting outwardly from said collar portion, said outer annular portion joining a central axially recessed area which defines a filler opening and carries plug means therein, which plug means is at least substantially confined within said recessed area in protected relation, said outer annular portion and central recessed area cooperatively defining a convex annular rim-like portion on the outer surface of said window means, said window means being formed from transparent relatively flexible material which by reason of its shape refracts light into the interior of said body portion and can be flexed into and out of retention in said groove means.

4. The hub cap of claim 3 wherein the outer periphery of said window means defines an annular foot-like portion which is radially outwardly inclined, said groove means being formed with axially spaced inner and outer radial shoulders between which said foot-like portion is received, and gasket means compressed between said foot-like portion and said inner radial shoulder.

5. The hub cap of claim 3 wherein the outer periphery of said window means defines an annular foot-like portion formed from a radially outwardly inclined base surface joining an inner surface heel portion and an outer surface toe portion, said groove means being formed with axially spaced inner and outer radial shoulders between which said foot-like portion is received, said toe portion engaging the inner surface of said outer radial shoulder, and gasket means compressed between said base surface and heel portion and the outer surface of said inner radial shoulder.

6. The hub cap of claim 3 wherein the outer periphery of said window means defines an annular foot-like portion formed from a radially outwardly inclined base surface joining an inner surface heel portion and an outer surface toe portion, said groove means being formed with axially spaced inner and outer radial shoulders between which said foot-like portion is received, said toe portion engaging the inner surface of said outer radial shoulder, and gasket means compressed between said base surface and heel portion and the outer surface of said inner radial shoulder, the outer surface of said outer radial shoulder being inclined inwardly toward the inner surface of said outer radial shoulder to receive said base surface in sliding engagement therealong during insertion of said window member.

7. A hub cap comprising an annular body portion of rigid material having an axially projecting collar portion formed along the inner end surface thereof with groove means, and a window member of generally outwardly projecting frusto-conical shape provided with a central recessed area mounting removable plug means, which plug means is at least substantially confined within said recessed area in protected relation, the outer periphery of said window member being removably retained in said groove means, said window member being formed from transparent and relatively flexible material.

8. The hub cap of claim 7 wherein the outer periphery of said window member defines an annular foot-like portion which is radially outwardly inclined, said groove means being formed with axially spaced inner and outer radial shoulders between which said foot-like portion is received, and gasket means compressed between said foot-like portion and said inner radial shoulder.

References Cited by the Examiner

UNITED STATES PATENTS

| | | | |
|---|---|---|---|
| 715,367 | 12/02 | Giles | 301—108 |
| 1,900,098 | 3/33 | Cooper | 220—60 X |
| 2,854,287 | 9/58 | Stephens | 301—108 |
| 2,977,019 | 3/61 | Henchert | 220—60 |
| 3,064,982 | 11/62 | Stephens | 277—95 |
| 3,077,284 | 2/63 | MacLaughlin | 220—60 |
| 3,114,579 | 12/63 | Isenbarger | 301—108 |

FOREIGN PATENTS 514,133   10/39   Great Britain.

ARTHUR L. LA POINT, *Primary Examiner*.